Dec. 25, 1956　　W. A. EHRLICH ET AL　　2,775,461

CHUCK

Filed Feb. 9, 1953

INVENTORS.
WALTER A. EHRLICH
EDWARD A. ZUKOWSKI
BY
Paul M. Gist

United States Patent Office 2,775,461
Patented Dec. 25, 1956

2,775,461

CHUCK

Walter A. Ehrlich, Bridgeport, and Edward A. Zukowski, Devon, Conn., assignors to The Bullard Company, a corporation of Connecticut Application February 9, 1953, Serial No. 335,736

2 Claims. (Cl. 279—119)

This invention relates to chucks, and particularly to that type of chuck in which work is centered by a pilot prior to gripping.

One of the difficulties in properly holding piloted work on a chuck during a working operation is the uneven gripping action of the chuck jaws occasioned by slight irregularities on the surface of the work. Although prior attempts have been made to overcome this difficulty, they have been complicated structures producing substantial frictional forces during operation preventing them from achieving the results desired.

The principal object of this invention is to provide a two-jaw chuck mechanism in which equalized gripping action of the chuck jaws will be obtained regardless of slight variations in the gripping surface of a workpiece.

Other objects include the provision of a two-jaw chuck, which jaws are adapted simultaneously to be reciprocated toward and from each other in a manner to equalize the gripping pressure of the jaws on a piloted workpiece; the provision of such a chuck in which a pivotally mounted yoke element is provided between a draw bar and the chuck actuating levers of a two-jaw chuck; and the provision of such a chuck having a jaw-movement compensating element for insuring equalized gripping pressure from each of the jaws.

Figure 1:
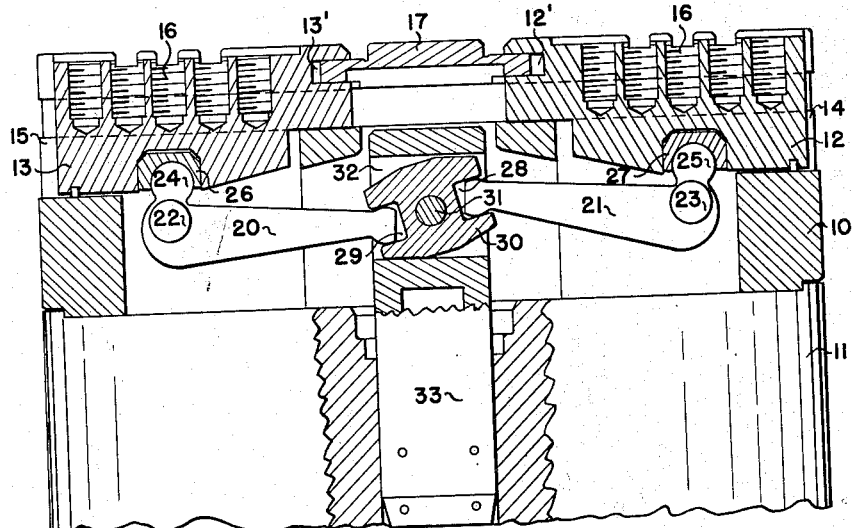
Figure 2:
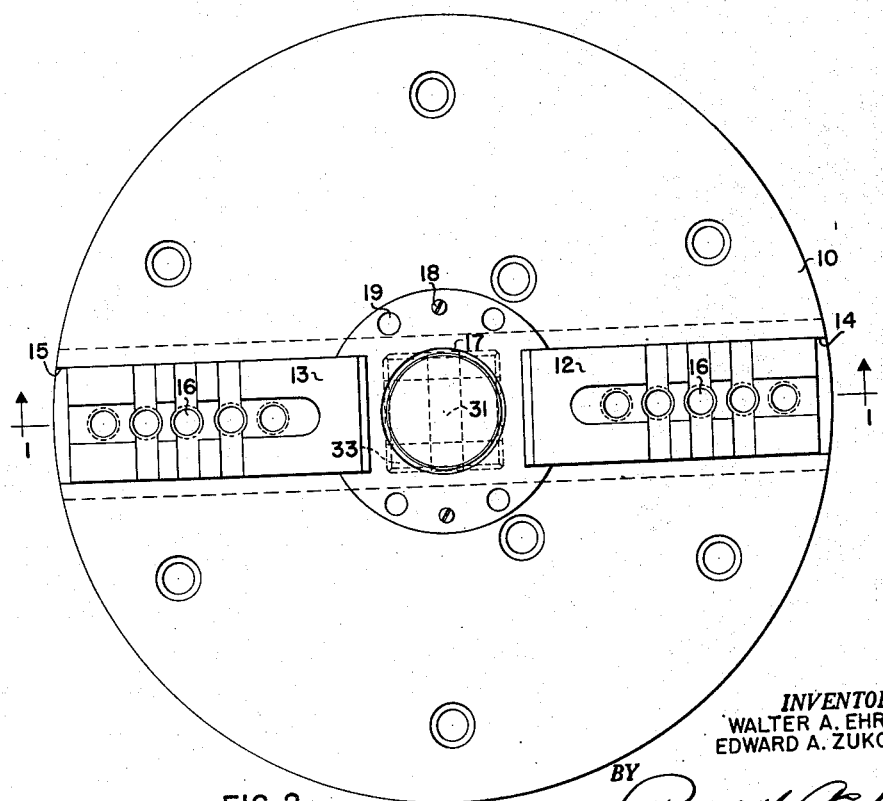

The above, other objects and novel features of the invention will become apparent from the following specification and accompanying drawings, in which:

Figure 1 is a sectional elevational view substantially along line 1—1 of Fig. 2, showing a two-jaw chuck to which the principles of the invention have been applied; and Fig. 2 is a top plan view of the chuck shown in Fig. 1.

Referring to the drawings, and particularly to Fig. 1, the invention is shown as applied to a two-jaw chuck including a base 10 adapted to be fixed to the head 11 of a work-supporting spindle (only a portion of the head 11 being shown in the drawings). The spindle is rotated in the usual manner by gears attached to its lower end (not shown). A pair of lower jaws 12 and 13 are reciprocably mounted within ways 14 and 15 formed in the base 10. The ways 14 and 15 are formed along a diameter of the base 10. The lower jaws 12 and 13 are provided with the usual tapped holes 16 in their upper surfaces for receiving screws adapted adjustably to hold top jaws thereto. The latter are employed to grip the work during a turning operation. A pilot plate is rigidly attached to the base 10 by screws 18, and includes a pilot 17, the center of which is coincident with the exact center of the chuck base 10. The pilot plate extends into and provides a sliding fit within slots 12' and 13' of the lower jaws 12 and 13 to prevent chips and foreign matter from affecting the chuck actuating mechanism. Openings 19 within the pilot plate permit screws to extend therethrough in the event it is desired to attach a supplemental pilot to the pilot plate for different internal diameter workpieces.

Simultaneous reciprocation of the lower jaws 12 and 13 toward and from each other is effected by the actuation of bell crank levers 20 and 21 having trunnions 22 and 23 mounted within the base 10. The short arms 24 and 25 of the bell cranks 20 and 21 are spherical in form and mate with corresponding spherical seating members 26 and 27 within the lower jaws 13 and 12, respectively. The free ends of the long arms of the bell cranks 20 and 21 seat within openings 28 and 29 of a yoke element or spool 30 pivotally mounted on a pin 31 that extends across an opening 32 formed within a draw bar 33. The construction and arrangement of the parts is such that vertical reciprocation of the draw bar 33 effects arcuate movement of the ends of the long arms of the bell cranks 20 and 21 to thereby effect reciprocative movement of the lower jaws 12 and 13 toward and from each other. This action causes the top jaws attached thereto to grip a workpiece mounted on the pilot 17. When the outer peripheral surface of the workpiece varies slightly, the pivotally mounted yoke element 30 equalizes the action of the gripping jaws mounted on the lower jaws 12 and 13 so that equalized gripping forces are applied by the two jaws, thereby effectively holding the workpiece during a metal working operation.

Although the various features of the improved two-jaw chuck have been shown and described in detail to fully disclose one embodiment of the invention, it will be evident that numerous changes can be made in such details and certain features may be used without others without departing from the principles of the invention.

What is claimed is:

1. In a two jaw chuck, a base; ways within said base lying along a diameter thereof; jaws in said ways; a work-supporting pilot rigidly mounted centrally of said base; a pivot pin mounted within said base in a plane including the axis of rotation of said base and at right angles thereto; a spoon having a groove pivoted on said pin such that the axis of the pin is diametrical to the groove and within the plane including said groove; and bell-crank levers each having a short and a long arm pivotally mounted within said base with the short arm of each engaging one of said jaws, and the long arm of each engaging said spool within the groove thereof, the length of the long arms being relatively large compared to the diameter of the spool, whereby a relatively high mechanical advantage of said bell cranks can be obtained.

2. In a two jaw chuck, a base; ways within said base lying along a diameter thereof; jaws within said ways; a work-supporting pilot rigidly mounted centrally of said base; a draw bar located along the longitudinal axis of rotation of said base; a pivot pin mounted in an opening extending through said draw bar, said pivot pin intersecting said longitudinal axis at right angles thereto; a spool having a groove pivoted on said pin and lying substantially within the peripheral confines of said draw bar with said pin lying along a diameter of said groove and within a plane including said groove; and bell-crank levers each having long and short arms pivotally mounted within said base with the one end of each short arm engaging one of said jaws, and the end of each long arm engaging said spool within the groove thereof.

References Cited in the file of this patent

UNITED STATES PATENTS

| 1,539,282 | Spurr | May 26, 1925 |
| 1,711,787 | Hopkins | May 7, 1929 |
| 2,524,485 | Sloan | Oct. 3, 1950 |
| 2,657,068 | Sloan | Oct. 27, 1953 |

FOREIGN PATENTS

| 404,501 | Great Britain | Jan. 18, 1934 |